US010365617B2

United States Patent
Lin et al.

(10) Patent No.: US 10,365,617 B2
(45) Date of Patent: Jul. 30, 2019

(54) AUTO DEFECT SCREENING USING ADAPTIVE MACHINE LEARNING IN SEMICONDUCTOR DEVICE MANUFACTURING FLOW

(71) Applicant: DMO Systems Limited, Hsinchu county (TW)

(72) Inventors: Jason Zse-Cherng Lin, Saratoga, CA (US); Shauh-Teh Juang, Saratoga, CA (US)

(73) Assignee: DMO Systems Limited, HsinChu County (TW)

( * ) Notice: Subject to any disclaimer, the term of this patent is extended or adjusted under 35 U.S.C. 154(b) by 301 days.

(21) Appl. No.: 15/375,186

(22) Filed: Dec. 12, 2016

(65) Prior Publication Data

US 2018/0164792 A1 Jun. 14, 2018

(51) Int. Cl.
*G05B 19/418* (2006.01)
*G05B 13/02* (2006.01)

(52) U.S. Cl.
CPC ..... *G05B 13/0265* (2013.01); *G05B 19/41875* (2013.01); *G05B 2219/32199* (2013.01);
(Continued)

(58) Field of Classification Search
CPC ..... G06T 7/0004; G06T 7/001; G06T 1/0021; G06T 2207/30148; G06T 2207/10061; G06T 7/0008; G06T 2207/30108; G06T 7/0006; G06T 7/0002; G06T 2207/10056; G06T 2207/30141; G06T 5/002; G06T 2207/30168; G06T 2207/20016; G06T 2207/20024; G06T 2207/20032; G06T 2207/20182; G06T 2207/20212; H01L 22/12; H01L 23/544; H01L 21/67288; G06K 9/46; G06K 9/6267; G06K 9/00536; G06K 9/4604; G06K 9/6218; G06K 9/6284; G06K 2209/19; G06K 9/00496;
(Continued)

(56) References Cited

U.S. PATENT DOCUMENTS

| 2002/0082738 A1* | 6/2002 | Goldman | G05B 19/41865 |
| | | | 700/109 |
| 2007/0288219 A1* | 12/2007 | Zafar | G03F 1/84 |
| | | | 703/14 |

(Continued)

*Primary Examiner* — Jonathan Han

(57) ABSTRACT

A system for auto defect screening using adaptive machine learning includes an adaptive model controller, a defect/nuisance library and a module for executing data modeling analytics. The adaptive model controller has a feed-forward path for receiving a plurality of defect candidates in wafer inspection, and a feedback path for receiving defects of interest already screened by one or more existing defect screening models after wafer inspection. The adaptive model controller selects data samples from the received data, interfaces with scanning electron microscope (SEM) review/inspection to acquire corresponding SEM results that validate if each data sample is a real defect or nuisance, and compiles model training and validation data. The module of executing data modeling analytics is adaptively controlled by the adaptive model controller to generate and validate one or more updated defect screening models using the model training and validation data according to a target specification.

24 Claims, 7 Drawing Sheets

(52) U.S. Cl.
CPC ............. *G05B 2219/32205* (2013.01); *G05B 2219/37224* (2013.01); *G05B 2219/45031* (2013.01); *Y02P 90/14* (2015.11); *Y02P 90/22* (2015.11); *Y02P 90/26* (2015.11)

(58) Field of Classification Search
CPC .. G06K 9/00147; G06K 9/00503; G06K 9/03; G06K 9/036; G06K 9/6217; G06K 9/6292; H04N 21/454
USPC ....... 382/100, 141, 143, 144, 145, 147, 149, 382/152; 29/833; 438/16; 702/34, 37
See application file for complete search history.

(56) References Cited

U.S. PATENT DOCUMENTS

2009/0268959 A1* 10/2009 Harada .................. G06T 7/001
    382/149
2011/0261190 A1* 10/2011 Nakagaki ............... G06T 7/001
    348/126
2014/0355867 A1* 12/2014 Lin ......................... G06T 7/001
    382/149

* cited by examiner

AUTO DEFECT SCREENING USING ADAPTIVE MACHINE LEARNING IN SEMICONDUCTOR DEVICE MANUFACTURING FLOW

BACKGROUND OF THE INVENTION

1. Field of the Invention

The present invention relates generally to semiconductor device fabrication, and more specifically to auto defect screening in the manufacturing flow of fabricating semiconductor devices.

2. Description of Related Art

The following description and examples are not admitted to be prior art by virtue of their inclusion in this section.

Semiconductor devices are manufactured by fabricating many layers of circuit patterns on wafers to form a massive number of transistors for integration as complicated circuits. In the manufacturing flow of semiconductor devices, lithographic process (LP) is responsible for transferring circuit patterns created by circuit designers onto wafers.

Photomasks/reticles with opaque and clear patterns according to the circuit patterns are used for patterning device layers on wafers. Distortion of the patterns can result from the effect of the neighboring patterns on the photomask and optical diffraction, photoresist development and etching, chemical-mechanical polishing (CMP) on adjacent layers of the wafer, and geometric and overlaying relationships between patterns of adjacent layers fabricated on the wafer. As the component density of the integrated circuits (ICs) has increased the complexity of the IC patterns and layouts, systematic defects resulting from distortion of patterns or random defects resulting from process variation or contamination can fail the device fabricated on the wafer.

Wafer inspections on various patterned layers are routinely adopted in the production flow of manufacturing semiconductor devices. Optical inspection that has throughput of more than one full wafer per hour is the major work force in wafer inspection. In a typical wafer inspection, defects are detected along with nuisances which may be false alarms or defects of no interests. As the design rule shrinks, the sizes of many critical defects are also smaller and the signals of defects become weaker in comparison to signals of noise and normal process variation. As a result, a huge number of nuisances are often reported before a small number of critical defects of interest can be detected in the advanced technology nodes. It is a challenge for semiconductor device manufacturers to identify those critical defects of interest during both ramp-up and mass production periods of the manufacturing process.

In an optical inspection tool, nuisance filtering technique has been provided in a more advanced inspection recipe to help reduce the number of nuisances. In order to take advantage of the nuisance filtering technique, users have to carefully analyze and review the inspection results collected from one or more wafers using various defect analysis tools or a scanning electron microscope (SEM) review station to label each defect candidate as being a real defect or nuisance. The labelled real defects and nuisances are used to generate a nuisance filter. The nuisance filter is then included in the advanced recipe of the inspection tool to filter out the nuisances.

As the device technology advances to 20 nm and below, in order to retain critical defects of interest, the number of nuisances detected in the wafer inspection usually represents more than 90% of the reported defects from an optical inspection tool even after the nuisance filtering technique has been applied. The performance of the nuisance filtering technique cannot achieve the desired result of effectively filtering out the nuisances for several reasons.

One is that it is practically impossible to collect adequate critical defect types for generating the nuisance filter from a small number of inspected wafers. Another reason is that optical patches collected for inspection cannot resolve circuit patterns and can only provide very limited information at the advanced technology nodes. In addition, the massive amount of data that an inspection tool has to process in order to meet the required high throughput also limit the complexity of the affordable computation of the nuisance filter in the inspection. Furthermore, the continuing variation in the process window may also change the behavior of the nuisances and trigger new defect types that make the nuisance filer obsolete and not effective. As a result, the inspection tool still has to output a large number of nuisances in order to not miss critical defects of interest.

Therefore, during the ramp-up period, a large number of engineers and operators are dedicated to visually review the inspection result using SEM review tool in order to screen out the critical defects of interest to diagnose and improve the yield of the manufacturing process. During the mass production period, a small number of defects are usually sampled for SEM review to control the manufacturing process assuming that most of critical defects have been eliminated in the ramp-up period. As a result, there is significant risk for the semiconductor device manufactures to discover unknown critical defects only after the yield of the manufactured semiconductor device has been significantly impacted.

SUMMARY OF THE INVENTION

The present invention has been made to overcome the above mentioned challenges and difficulties in screening out critical defects of interest in wafer inspection for the semiconductor device manufacturing process. Accordingly, the present invention provides a system and method for auto defect screening in the semiconductor device manufacturing flow using adaptive machine learning.

The system for the adaptive machine learning according to the present invention comprises an adaptive model controller, a defect/nuisance library and a module for executing data modeling analytics. The adaptive model controller receives data from feed-forward and feedback paths in the semiconductor device manufacturing flow, interfaces with SEM review/inspection, updates the defect/nuisance library, compiles and sends model training data and model validation data for executing the data modeling analytics.

The adaptive model controller includes a defect sampler, a SEM interface and a training data and model manager. The defect sampler receives a plurality of defect candidates in wafer inspection from the feed-forward path and defects of interest that have already been screened by one or more existing defect screening models after wafer inspection from the feedback path.

The defect sampler sends data samples including sampled defect candidates and defects of interest to the SEM interface that communicates with SEM review/inspection to acquire SEM results corresponding to the data samples. Each data sample is validated and labelled as being a real defect or nuisance in the corresponding SEM results.

The training data and model manager receives the data samples and corresponding SEM results, establishes and updates a defect/nuisance library, and compiles model training data and model validation data for the data modeling analytics to generate a data model as the defect screening model for auto defect screening. In the initial phase of the auto defect screening, the system executes a few continuous iterations of the adaptive machine learning to establish one or more defect screening models based on a target specification. The defect sampler continues to receive feedforward and feedback data for the training data and model manager to control when the defect screening models should be updated by the data modeling analytics.

The present invention further provides a critical signature library that interfaces with the data modeling analytics to perform critical signature analytics and generate critical signature models for auto defect screening. The critical signature library includes a plurality of critical signature databases. Each critical signature data base stores a number of critical circuit patterns, the associated design clips, defect features, optical patches, and SEM images, and the corresponding critical signature models.

BRIEF DESCRIPTION OF THE DRAWINGS

The present invention will be apparent to those skilled in the art by reading the following detailed description of preferred embodiments thereof, with reference to the attached drawings, in which.

DETAILED DESCRIPTION OF THE PREFERRED EMBODIMENT

Figure 1:
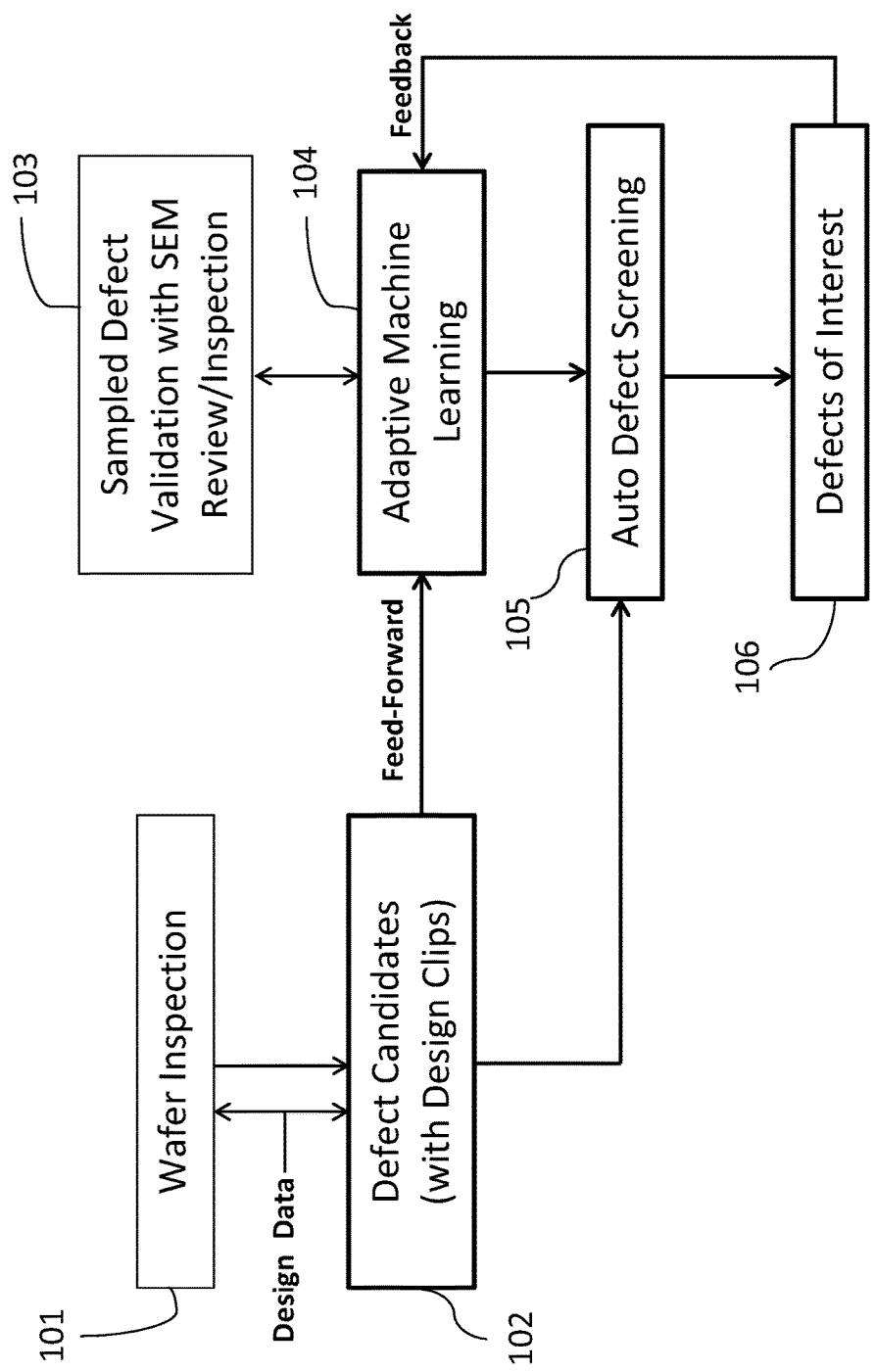
FIG. 1 shows a block diagram of auto defect screening using adaptive machine learning in the manufacturing flow of fabricating semiconductor devices according the present invention.

FIG. 1 shows an embodiment of auto defect screening using adaptive machine learning in the semiconductor device manufacturing flow according to the present invention. With reference to FIG. 1, wafer inspection 101 is routinely performed in semiconductor device manufacturing for identifying defect candidates 102. In an inline wafer inspection, the inspected area usually covers a full wafer or significant portions of the full wafer. Although using design data of the manufactured semiconductor device in a wafer inspection is optional, the design data are provided more and more to help the wafer inspection achieve higher sensitivity as well as more accurate inspected areas.

Die-to-die optical inspection is most widely used for wafer inspection. Optical images of dies with high resolution are scanned for comparison and detecting defects. In an advanced technology node, an optical inspection tool with inspection pixel sizes in the order of 30 to 50 nm is typically used because the fast throughput of optical inspection can achieve the speed of more than one full wafer per hour. E-beam inspection tools may provide higher sensitivity for hot spot inspection. However, their throughput remains too slow for inline full wafer inspection.

The output of the wafer inspection is a list of defect candidates 102. Each defect candidate is reported with its coordinate, bounding box, size and other features that the inspection tool determines and extracts from the optical images. As pointed out earlier, a huge number of defect candidates 102 are often reported from the wafer inspection as the design rule of the semiconductor device shrinks. It is not unusual that more than 90 percent of the defect candidates 102 are nuisances or false alarms in the advanced technology nodes. The challenge to the semiconductor device manufacturers is how to screen out the real defects of interest from the huge amount of defect candidates to diagnose critical yield limiting problems in process ramp-up or perform routine process monitoring in mass production.

As pointed out earlier, although a nuisance filter may be provided in an advanced inspection recipe to help reduce nuisances, the number of defect candidates 102 is still too large for process diagnosis in ramp-up, and not effective for inline monitoring. As shown in FIG. 1, the present invention provides a method for auto defect screening 105 to screen out defects of interest 106 based on adaptive machine learning 104 with interface to SEM review/inspection 103 for acquiring SEM results that validate real defects and nuisances. If the design data is available, design clips in the identified defective areas of the defect candidates are cut from the design data for the adaptive machine learning.

The recent advance in electron beam technology has shown that SEM review/inspection can be performed with an image pixel size down to 1 nm. Using such high resolution images in cooperation with advanced algorithms, SEM review/inspection has proven to validate if a defect candidate is real or nuisance with 95% accuracy although the throughput of SEM review/inspection is too low for full wafer inspections.

In order to perform the adaptive machine learning 104 of the present invention, both feed-forward and feed-back paths and provided to receive defect candidates and defects of interest for SEM review/inspection to validate real defects as shown in FIG. 1. Defect candidates before screening are fed forward and defects of interest after screening are fed back for the machine learning technique to adaptively train and update a data model for auto defect screening.

Die-to-die SEM inspection by comparing die-to-die SEM images of the sampled defect candidates can be performed to acquire accurate SEM results. As have been observed, many nuisances detected in optical inspection due to interference effect caused by surface roughness or layer thickness variation can be easily identified based on high resolution SEM images. Die-to-database SEM inspection by comparing SEM images against the corresponding design clips can also be performed to determine if the defect candidates are real or nuisance. More detailed classification can further be performed based on analyzing the SEM images and design clips.

Figure 2:
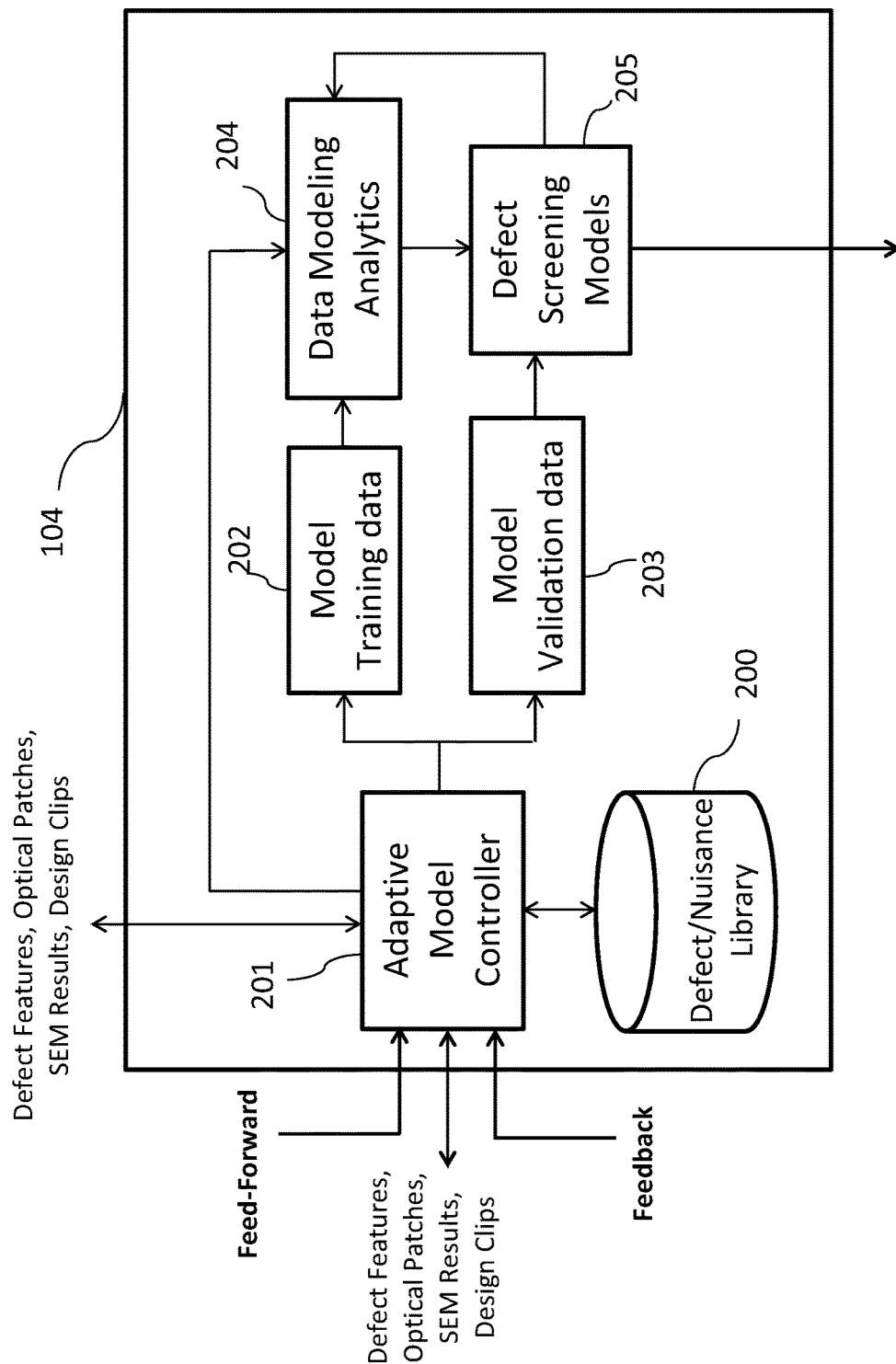
FIG. 2 shows the block diagram of a system for performing the adaptive machine learning for auto defect screening according to the present invention.

According to the present invention, the SEM results with validated and labelled real defects or nuisances acquired from SEM review/inspection 103 and associated defect information such as defect features and optical patches reported by the wafer inspection 101, and design clips cut from the design data are used in the adaptive machine learning 104. As shown in FIG. 2, the adaptive machine learning 104 includes a defect/nuisance library 200, an adaptive model controller 201 that interfaces with the defect/nuisance library 200 to store sampled defect candidates as well as selected defects of interest that have been validated by SEM review/inspection.

Figure 3:
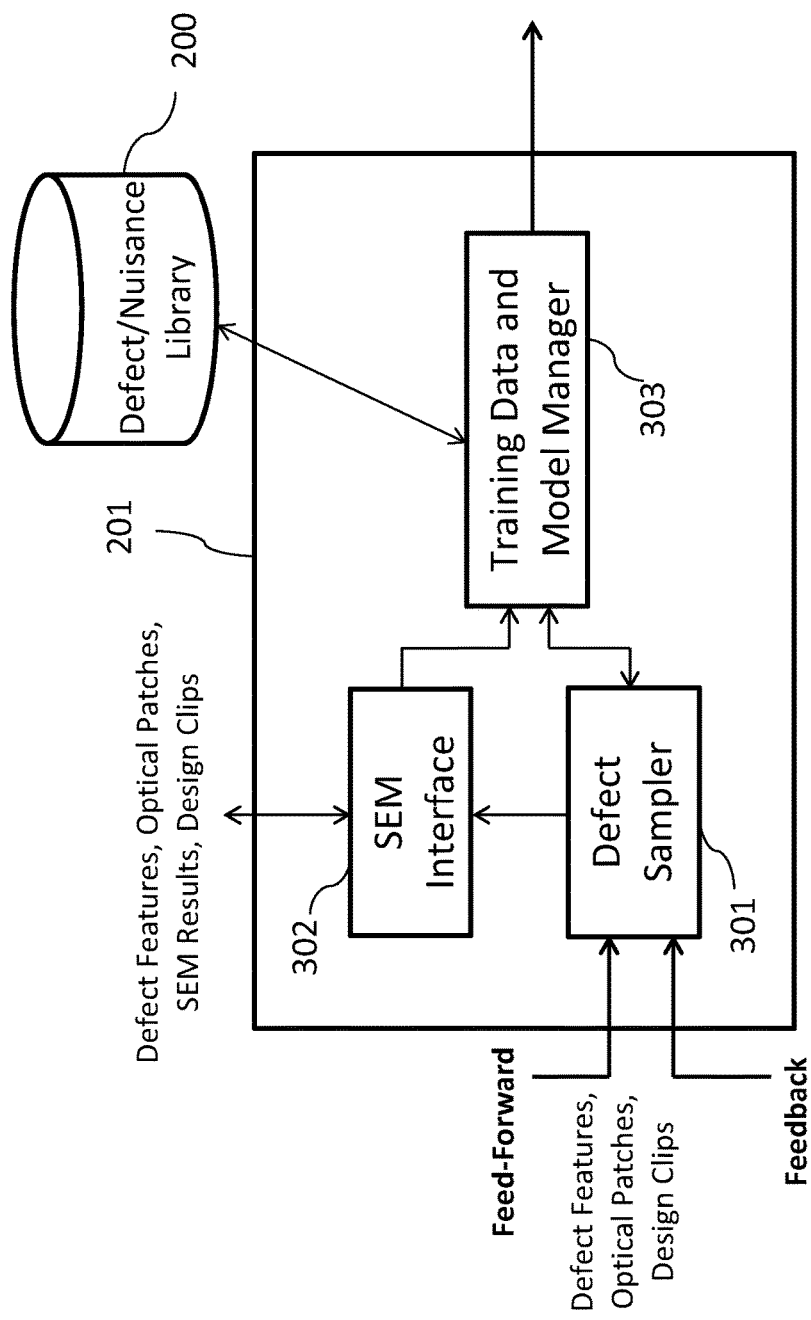
FIG. 3 shows the block diagram of the adaptive model controller in the adaptive machine learning according to the present invention.

The adaptive model controller 201 includes a defect sampler 301, a SEM interface 302 and a training data and model manager 303 as shown in FIG. 3. The defect sampler 301 receives defect features, optical patches and design clips of the defect candidates in the feed-forward path or the defects of interest in the feed-back path. Defect candidates are sampled so that the number of defect candidates after sampling is manageable by SEM review/inspection 103. The locations of sampled defect candidates and defects of interest along with their corresponding design clips if available are sent to SEM interface 302 that communicates with a SEM review/inspection tool to acquire SEM results that validate and label if the sampled defect candidates or defects of interest are real defects or nuisances.

In the feed-forward path, the defect candidates 102 may be sparsely and randomly sampled by the defect sampler 302 in the adaptive model controller 201 if the number of defect candidates is too large. Other sampling strategies such as strategies based on the importance of care areas set up for inspecting the wafers or the pattern densities in the corresponding design clips may also be adopted by the defect sampler 301.

For example, if hot spots predicted by optical proximity correction (OPC) verification have been set up in the inspection for critical defect monitoring, defect candidates in the predicted hot spots may have to be sampled more frequently by the defect sampler 301. Because defects in blank areas may have no impact to the manufactured semiconductor devices, defect candidates in the blank area may be ignored. However, defects in areas of dense circuit patterns are likely to fail the manufactured semiconductor devices and it may be preferable to sample them with higher priority.

Based on the SEM validated and labelled results, the training data and model manager 303 stores and updates the labelled data samples, which include defect candidates and defects of interest but may be labelled as real defects or nuisances, in the defect/nuisance library 200. It should be noted that the defect/nuisance library 200 must include both real defects and nuisances after SEM validation. The training data and model manager 303 further assigns a portion of the labelled data samples as model training data 202 and another portion of the labelled data samples as model validation data 203 and initiates the execution of the data modeling analytics 204 to generate one or more data models as defect screening models 205.

During the initial phase of the adaptive machine learning 104, the present invention may sample and accumulate the defect candidates to set up the defect/nuisance library and perform the data modeling analytics 204 shown in FIG. 2 through a few continuous iterations until a model target specification has been satisfied by the generated defect screening models 205.

In the generation of the defect screening models 205, the model target specification is set for the data modeling analytics 204 to validate the performance of the generated defect screening models 205 based on the model validation data 203. For example, the model target specification may be set based on percentages of accuracy and purity in terms of real defects and nuisances predicted by the defect screening model 205 with the model validation data 203.

In the field of machine learning, a number of features associated with each data sample in the training data are typically used for training and generating the data model. The data modeling analytics 204 shown in FIG. 2 adopts similar principles and uses algorithms widely available in machine learning.

According to the present invention, defect features reported by the wafer inspection are included as features for training and generating the defect screening models 205. Some other image features extracted from the optical patches of each data sample are also extracted. Examples of image features are maximum or minimum or average gray level, maximum or minimum or average gradient of the gray level of the pixels in an optical patch image, or of the difference pixels between test and reference pixels of the optical patch images. In addition, a set of features are extracted from the design clips corresponding to the data sample. Examples of the features extracted from the design clips are pattern density, pattern perimeter, minimum or maximum linewidth, minimum or maximum spacing, pattern orientation, number of edges, inside or outside corners, spatial frequency distribution, . . . , etc. These features described above are only examples and many others can be extracted based on specific interest.

With a target specification being set, a data model can be trained using the features extracted from each data sample in the model training data 202. Many data model training algorithms have been widely used in data analysis and data mining of machine learning. For example, data modeling algorithms are available based on decision tree, linear regression, nonlinear regression, support vector machine (SVM), k-Means clustering, hierarchical clustering, rule based, neuro network, . . . , etc. All those data model training algorithms can be applied to the model training data 202 to establish a data model as a defect screening model for screening defects.

After a data model for the model training data 202 has been established as the defect screening model 205, the data model is applied to the model validation data 203. The same sets of features are extracted for each data sample in the model validation data 203. The defect screening model 205 is used to test and predict each data sample in the model validation data 203 as being a real defect or nuisance. The predicted result is checked against the SEM results of the model validation data 203 in the data modeling analytics 204 to verify if the target specification has been satisfied. If necessary, multiple models may be generated by using different algorithms to meet the target specification.

In order to generate a stable and usable defect screening model 205, defect candidates that are representative enough to provide features for parametrically or statistically distinguishing real defects from nuisances have to be fed to the data modeling analytics 204 in the adaptive machine learning 104. To achieve better defect screening, defect candidates sampled from inspecting a number of wafers may be preferably based on priorities of care areas, predicted hot spot areas, pattern densities of circuit patterns, . . . , etc, as discussed earlier.

According to the adaptive machine learning of the present invention, the feed-forward path shown in FIG. 1 provides the mechanism for acquiring sampled defect candidates including real defects and nuisances, and the SEM interface 302 provides the mechanism for validating and labelling if the defect candidates are real defects or nuisances. The feedback path provides the mechanism for acquiring defects of interest that have already been screened to validate the effectiveness of the defect screening model 205.

It can be understood that a defect screening model 205 may work effectively if the data behavior of real defects and nuisances are sufficiently captured in the model training data

202. However, as the design rule shrinks, the process window becomes tighter. Process variation may result in new defect types or alter the nature of nuisances. In the present invention, the feed-forward path helps to capture new defect types or nuisances with altered behavior, and the feedback path helps to capture those nuisances that have not been screened out.

In accordance with the present invention, the training data and model manager 303 also determines how the defect candidates from the feed-forward path and the defects of interest in the feedback path should be sampled or selected by the defect sampler 301 and used for the training data. For example, the defect candidates received from the feed-forward path may be sampled uniformly and randomly across the care areas, proportionally to the priorities of the care areas or pattern densities of the care areas as discussed before. If the defects of interest received from the feedback path are validated to be real, they can be ignored because it shows that the defect screening model has performed correctly. However, if the defects of interest are validated to be nuisances, it would be preferable to include them in the model training data to enhance the generated defect screening model.

As shown in FIG. 2, the validated and labelled data samples are stored in the defect/nuisance library 200 and used as the model training data 202 and model validation data 203. It should be noted that the training data and model manager 303 manages the data stored in the defect/nuisance library. It has been known that if the number of data samples in the model training data 202 is too large, the trained model may be over fit. Therefore, the training data and model manager 303 keeps a proper number of defects or nuisances stored in the defect/nuisance library by removing redundant data if necessary. For example, feature correlations between data samples may be computed and new data samples highly correlated with existing data samples can be eliminated.

In order to achieve optimal performance of the defect screening model, training data and model manager 303 in the adaptive model controller 201 also determines when the defect screening model should be updated. The defect screening model may be updated periodically or based on some other criteria. For example, if the SEM validation results show that defects of interests received in the feedback loop has been deviated from the target specification, the defect screening models need to be updated.

Figure 4:
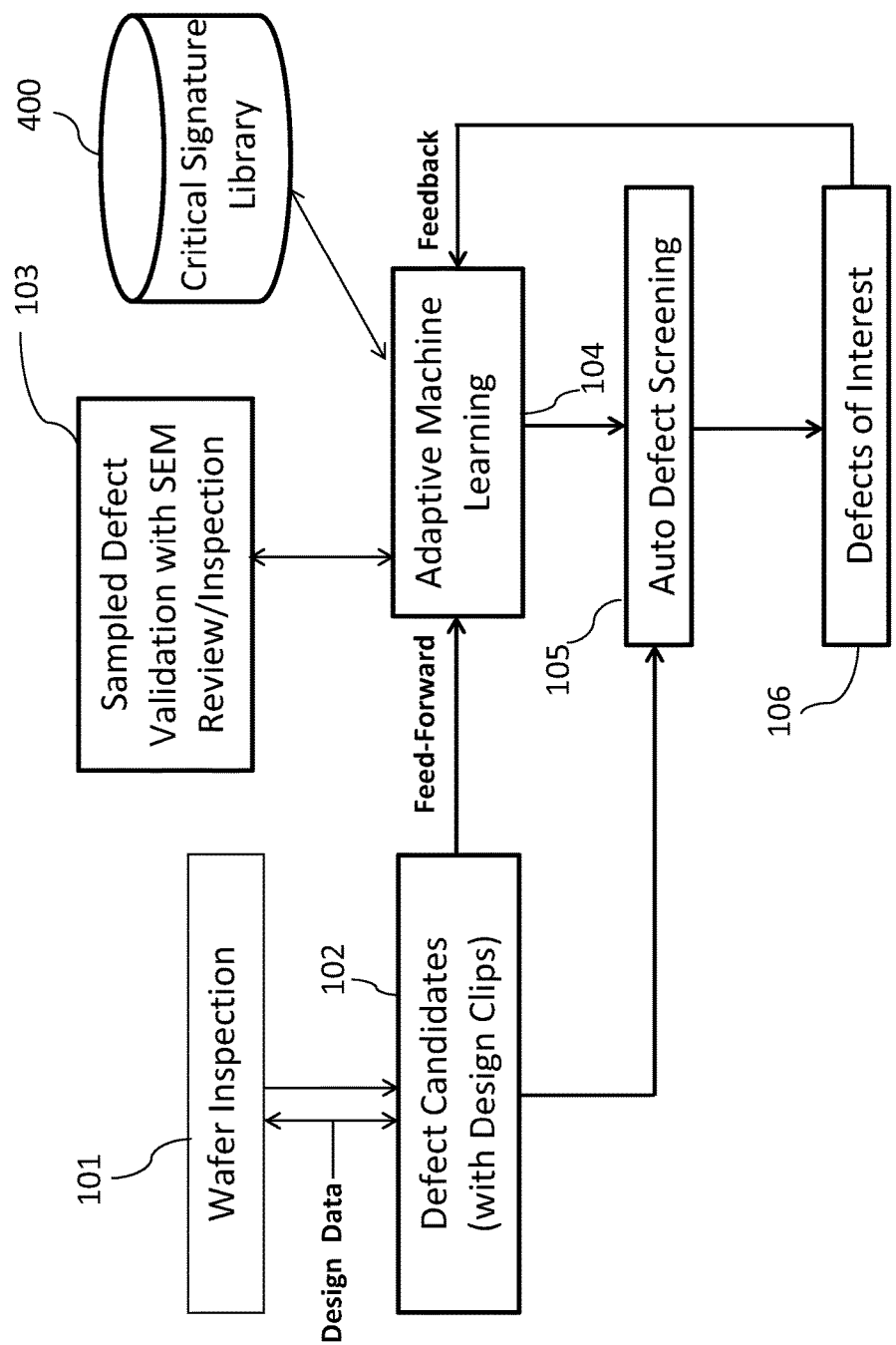
FIG. 4 shows that auto defect screening using adaptive machine learning further interfaces with a critical signature library according to the present invention.
Figure 5:
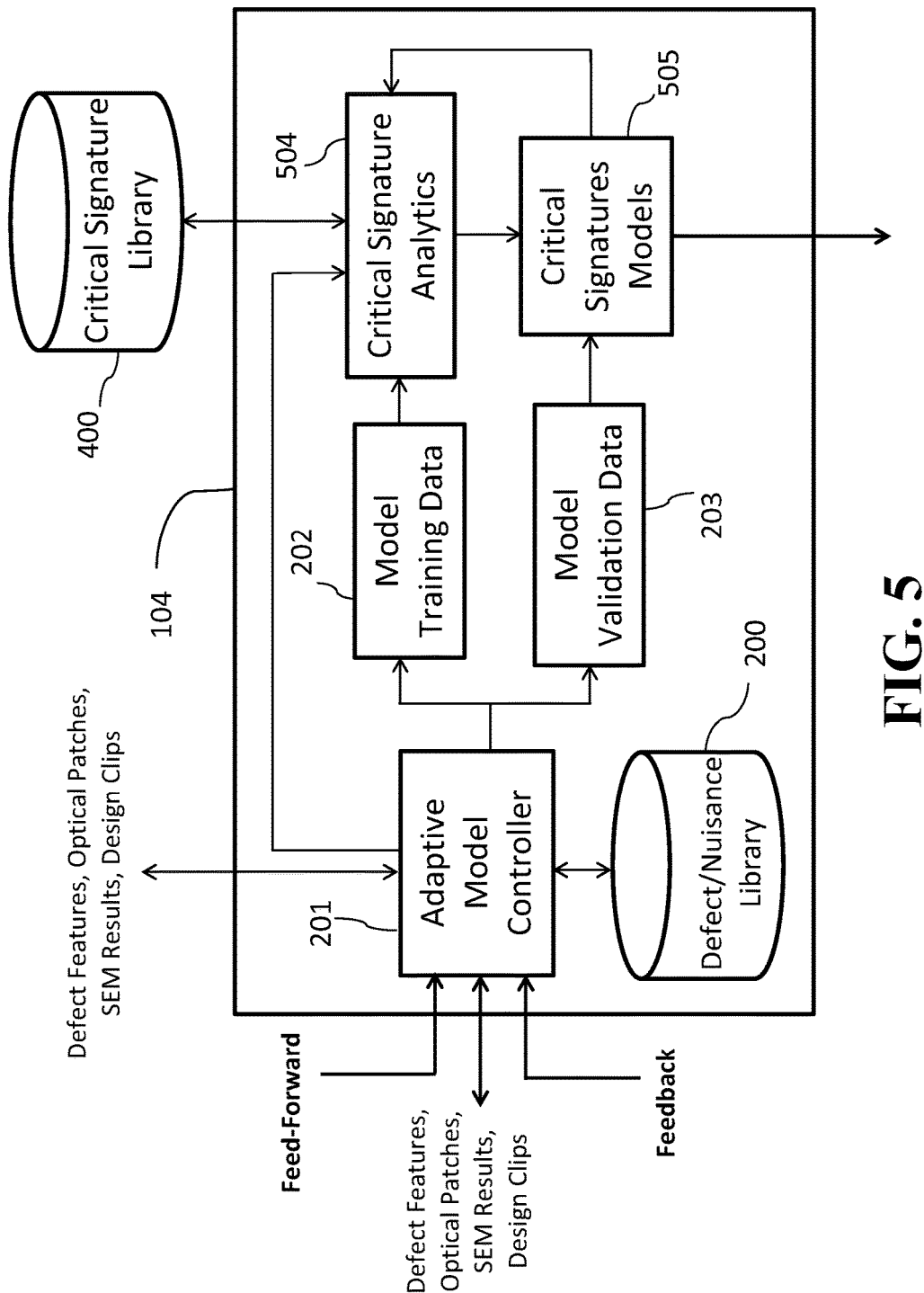
FIG. 5 shows that the adaptive machine learning generates critical signature models using critical signature analytics with reference to the critical signature library.

According to the present invention, a critical signature library 400 can be established and updated for the adaptive machine learning 104 as shown in FIG. 4. The data modeling analytics 204 of FIG. 2 performs the tasks of critical signature analytics 504 for critical defects as shown in FIG. 5. The data models generated in association with the critical defects are the critical signature models 505 that are used by the adaptive machine learning 104 for auto defect screening 106. The critical signature models along with the associated circuit patterns, design clips, defect features, optical patches, SEM images are saved and updated in a corresponding critical signature database 601 of the critical signature library 400 as shown in FIG. 6.

Figure 6:
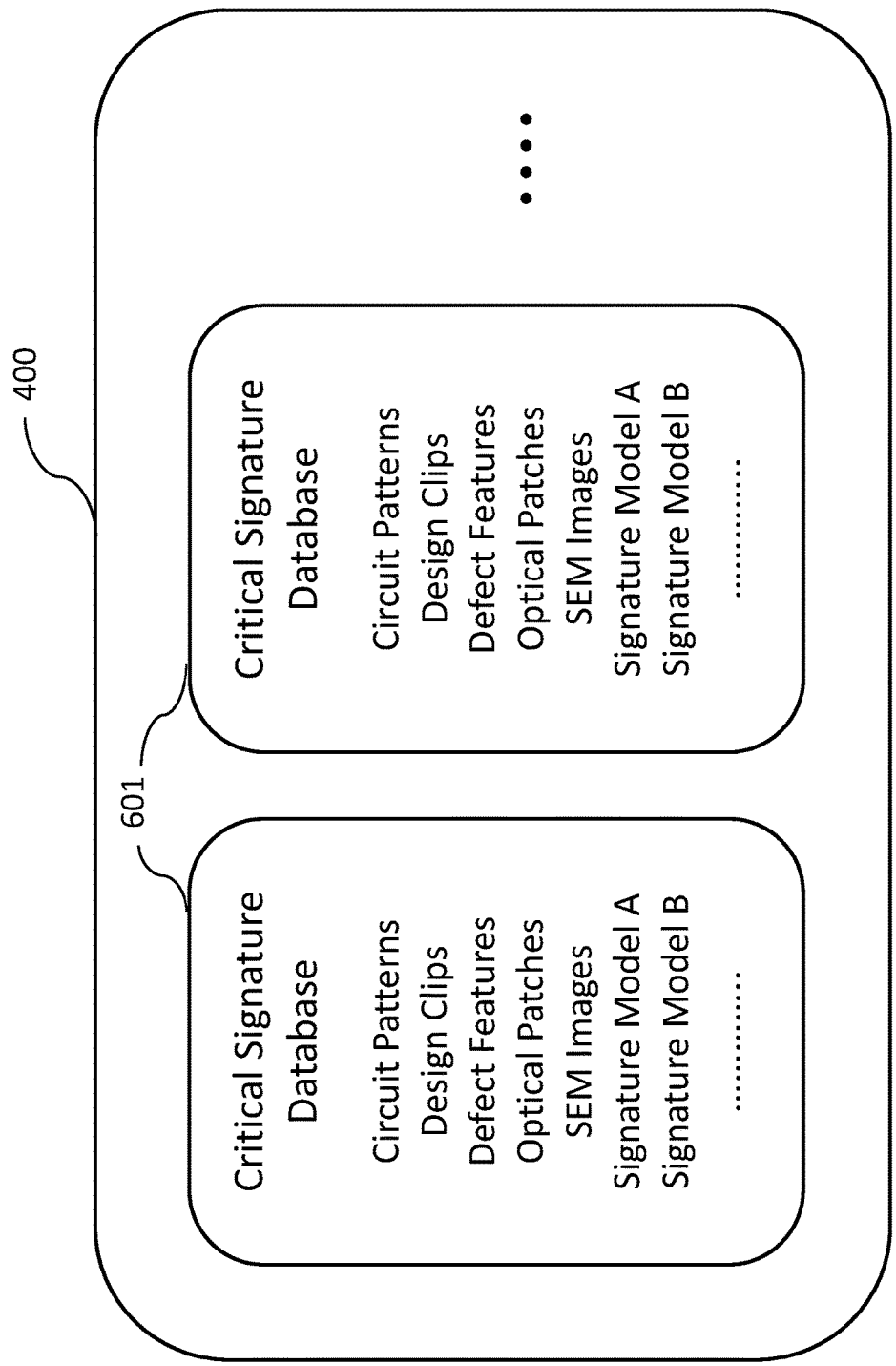
FIG. 6 shows that the critical signature library includes a number of critical signature data bases.

The critical signature library 400 is a storage device configured to store a library of critical signature databases 601 as shown in FIG. 6. In the critical signature library 400, various indexes may be used to index each critical signature database 601. For example, the database may be indexed by technology nodes such as 14 nm, 10 nm or 7 nm technology node, or indexed by manufacturing lines, etc. Each critical signature database 601 includes a plurality of known critical circuit patterns along with their corresponding data and critical signature models.

In the present invention, each critical signature database 601 includes one or more data models generated as one or more critical signature models by the critical signature analytics 504 in the adaptive machine learning 104. Multiple data models may be established and saved for a corresponding critical signature database 601 by using different modeling algorithms or different sets of features extracted from the design clips or optical patches of the critical defects.

It should also be noted that the gist of the present invention resides on modeling the effect of the semiconductor manufacturing process on the circuit patterns that result in defects with data models based on features extracted from the design clips or corresponding optical patches. A good data model can be established only if the features used in the data modeling can capture the effect of the semiconductor manufacturing process on the circuit patterns.

It has been well known and observed that optical proximity effect plays an important role in patterning the chip design layout. In order to improve the accuracy and thoroughness of the established data models, the features used in the data modeling analytics 204 of the present invention for generating the data models 205 may include features extracted from design clips of different sizes for the circuit patterns associated with each defect. By having different sizes of circuit patterns, the optical proximity effect can better be captured in the data models.

Because the circuit patterns are stacked layer by layer in manufacturing the semiconductor device, in addition to using circuit patterns of different sizes for feature extraction, the present invention also uses design clips of the layers underneath the current design layer for extracting features to capture the effects of multiple circuit layers. Boolean operators such as OR, Exclusive OR, AND, NOT, etc., can be applied to the design clips including the current layer and underneath layers to form a composite circuit pattern for feature extraction.

Figure 7:
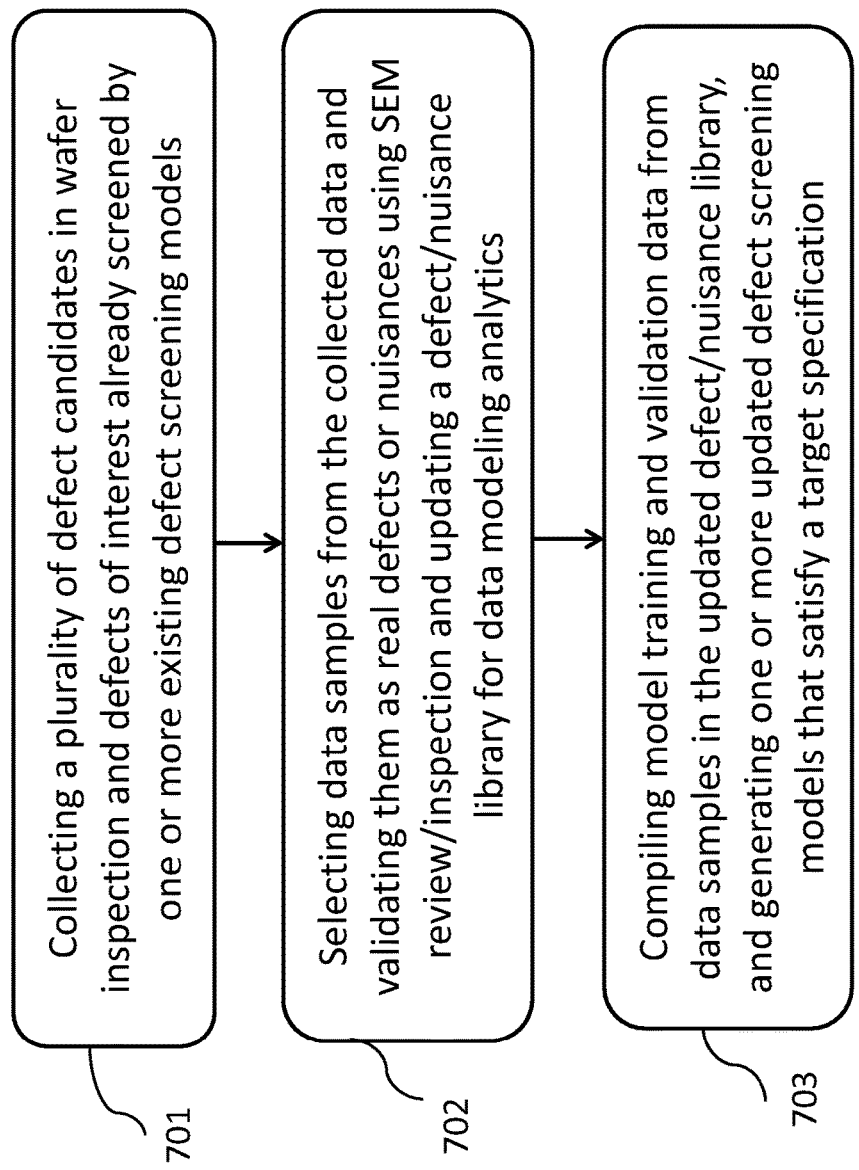
FIG. 7 shows a flow chart of the method for performing the adaptive machine learning for auto defect screening according to the present invention.

FIG. 7 shows a flow chart summarizing the method for auto defect screening using adaptive machine learning according to the present invention. The method collects a data set including a plurality of defect candidates in wafer inspection and defects of interest already screened by one or more existing defect screening models in step 701. The defect candidates are collected from wafer inspection before they are screened by the existing defect screening models. The defects of interest are the screened results after auto defect screening with previous wafer inspection.

Data samples in the data set including sampled defect candidates and defects of interest are validated as being real defects or nuisances by using SEM review/inspection and then used to update the data samples stored in the defect/nuisance library for data modeling analytics in step 702.

Model training and validation data are compiled in step 703. One or more data models are generated by the data modeling analytics as the updated defect screening models based on features extracted from the data associated with the data samples in the model training data, and further validated to meet a target specification by the model validation data in step 703.

As described before, the method of auto defect screening using adaptive machine learning can improve the effectiveness of defect screening by using defect screening models adaptive to possible process window variation. The defect candidates provided in the feed-forward path ensure that new defect types or nuisance natures are taken into account for updating the defect screening models. The defects of interest in the feedback path checks if the defect screening model is satisfactory and nuisances slipped through the defect screening model are further incorporated in the model training data to update and improve the defect screening model.

It may be worth mentioning that the adaptive machine learning as shown in FIGS. 2, 3, 4 and 5 in the present invention can be implemented by a computing system that has one or more computing processors in cooperation with one or more memory devices configured to execute program instructions designed to perform the functions of the adaptive model controller 201, data modeling analytics 204, defect sampler 301, SEM interface 302 and training data and model manager 303. Dedicated hardware devices designed to deliver the required functionalities can also be used instead of a general purpose computing system. The defect/nuisance library 200 and the critical signature library 400 can be constructed using the memory devices controlled by the computing processors.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A system for auto defect screening in manufacturing a semiconductor device, said system having one or more computing processors and one or more memory devices configured and programmed to perform functional modules comprising:

an adaptive model controller including a defect sampler having a feed-forward input receiving a plurality of defect candidates acquired in inspecting one or more wafers of said semiconductor device and a feedback input receiving defects of interest already screened by using one or more existing defect screening models, a scanning electron microscope (SEM) interface receiving defect information of data samples selected from said plurality of defect candidates and said defects of interest and interfacing with a SEM review/inspection tool to acquire corresponding SEM results of said data samples, and a training data and model manager receiving said data samples and corresponding SEM results and outputting model training data and model validation data;

a data modeling analytics executor receiving said model training data and said model validation data and generating one or more updated defect screening models for auto defect screening from said model training data to satisfy a target specification validated with said model validation data; and an auto defect screener using said one or more updated defect screening models to predict if a defect candidate is a real defect or nuisance and filter out the predicted nuisance;

wherein each of said data samples is validated and labelled as being a real defect or nuisance in said corresponding SEM results, and said adaptive model controller controls when to generate said one or more updated defect screening models according to a pre-set criteria.

2. The system as claimed in claim 1, wherein said adaptive model controller further interfaces with a defect/nuisance library in which data samples forming said model training data and said model validation data are saved and updated.

3. The system as claimed in claim 1, wherein a certain percentage of said plurality of defect candidates received from said feed-forward input are randomly and uniformly selected for said data samples.

4. The system as claimed in claim 1, wherein said plurality of defect candidates received from said feed-forward input are selected for said data samples according to priorities of care areas set up in inspecting one or more wafers of said semiconductor device.

5. The system as claimed in claim 1, wherein said plurality of defect candidates received from said feed-forward input are selected for said data samples according to pattern densities of one or more design clips associated with each of said plurality of defect candidates in chip design layout of said semiconductor device.

6. The system as claimed in claim 1, wherein each defect in said defects of interest received from said feedback input is ignored if the defect is validated as being real in the corresponding SEM results.

7. The system as claimed in claim 1, wherein said adaptive model controller controls when to generate said one or more updated defect screening models according to validated real defects and nuisances in the corresponding SEM results of said defects of interest received from said feedback input with reference to said target specification.

8. The system as claimed in claim 1, wherein said data modeling analytics executor extracts a set of features associated with each data sample in said model training data and generates said one or more updated defect screening models based on said set of features, and said auto defect screener extracts said set of features associated with each defect candidate to predict if the defect candidate is a real defect or nuisance using said one or more updated defect screening models.

9. The system as claimed in claim 8, wherein said data modeling analytics executor further interfaces with a critical signature library and one or more data models are generated by said data modeling analytics executor and saved as one or more critical signature models in a corresponding signature database in said critical signature library with each critical signature model being generated by a different set of features.

10. The system as claimed in claim 8, wherein said data modeling analytics executor further interfaces with a critical signature library and one or more data models are generated by said data modeling analytics executor and saved as one or more critical signature models in a corresponding signature database in said critical signature library with each critical signature model being generated by a different data modeling algorithm.

11. The system as claimed in claim 8, wherein said set of features associated with each data sample in said model training data includes features extracted from one or more design clips in chip design layout of said semiconductor device associated with the data sample.

12. The system as claimed in claim 11, wherein said one or more design clips in said chip design layout includes at least one design clip of an underneath layer of a current layer of a wafer from which the associated data sample is acquired.

13. A method for auto defect screening in manufacturing a semiconductor device using a system having one or more computing processors and one or more memory devices configured and programmed to function as an adaptive model controller, a data modeling analytics executor and an auto defect screener, said method comprising the steps of:

preparing a feed-forward input for said adaptive model controller to receive a plurality of defect candidates acquired from inspecting one or more wafers of said semiconductor device and a feedback input for said adaptive model controller to receive defects of interest already screened by using one or more existing defect screening models;

selecting data samples from said plurality of defect candidates and said defects of interest in said adaptive model controller and interfacing with a scanning electron microscope (SEM) review/inspection tool to acquire corresponding SEM results of said data samples, each of said data samples being validated and labelled as being a real defect or nuisance in said corresponding SEM results;

compiling model training data and model validation data from accumulated data samples in said adaptive model controller according to the corresponding SEM results of the accumulated data samples;

using said data modeling analytics executor to perform data modeling analytics to generate one or more updated defect screening models from said model training data to satisfy a target specification validated with said model validation data; and using said one or more updated defect screening models in said auto defect screener to predict if a defect candidate is a real defect or nuisance and filter out the predicted nuisance;

wherein said method further uses said adaptive model controller to control when to generate said one or more updated defect screening models according to a pre-set criteria.

14. The method as claimed in claim 13, wherein said adaptive model controller further interfaces with a defect/nuisance library in which data samples forming said model training data and said model validation data are saved and updated.

15. The method as claimed in claim 13, wherein a certain percentage of said plurality of defect candidates received from said feed-forward input are randomly and uniformly selected for said data samples.

16. The method as claimed in claim 13, wherein said plurality of defect candidates received from said feed-forward input are selected for said data samples according to priorities of care areas set up in inspecting one or more wafers of said semiconductor device.

17. The method as claimed in claim 13, wherein said plurality of defect candidates received from said feed-forward input are selected for said data samples according to pattern densities of one or more design clips associated with each of said plurality of defect candidates in chip design layout of said semiconductor device.

18. The method as claimed in claim 13, wherein each defect in said defects of interest received from said feedback input is ignored if the defect is validated as being real in the corresponding SEM results.

19. The method as claimed in claim 13, wherein said adaptive model controller controls when to generate said one or more updated defect screening models according to validated real defects and nuisances in the corresponding SEM results of said defects of interest received from said feedback input with reference to said target specification.

20. The method as claimed in claim 13, wherein said data modeling analytics executor extracts a set of features associated with each data sample in said model training data and generates said one or more updated defect screening models based on said set of features, and said auto defect screener extracts said set of features associated with each defect candidate to predict if the defect candidate is a real defect or nuisance using said one or more updated defect screening models.

21. The method as claimed in claim 20, wherein said data modeling analytics executor further interfaces with a critical signature library and one or more data models are generated by said data modeling analytics executor and saved as one or more critical signature models in a corresponding signature database in said critical signature library with each critical signature model being generated by a different set of features.

22. The method as claimed in claim 20, wherein said data modeling analytics executor further interfaces with a critical signature library and one or more data models are generated by said data modeling analytics executor and saved as one or more critical signature models in a corresponding signature database in said critical signature library with each critical signature model being generated by a different data modeling algorithm.

23. The method as claimed in claim 20, wherein said set of features associated with each data sample in said model training data includes features extracted from one or more design clips in chip design layout of said semiconductor device associated with the data sample.

24. The method as claimed in claim 23, wherein said one or more design clips in said chip design layout includes at least one design clip of an underneath layer of a current layer of a wafer from which the associated data sample is acquired.

* * * * *